July 8, 1969 L. KING 3,454,449
APPARATUS FOR PRODUCING SANDWICH LAMINATIONS
Filed July 1, 1964 Sheet 1 of 2
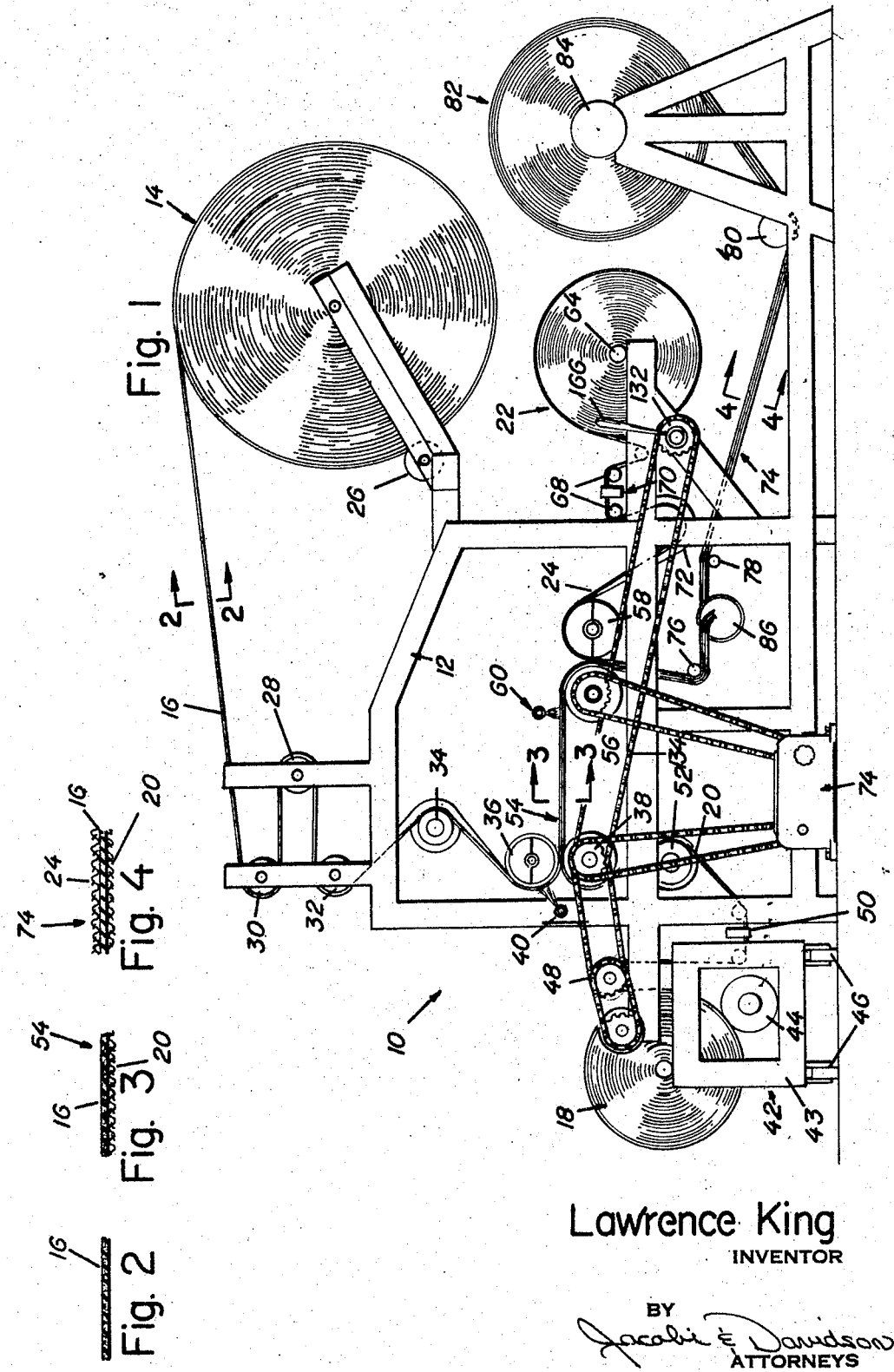
Lawrence King
INVENTOR
BY Jacobi & Davidson
ATTORNEYS

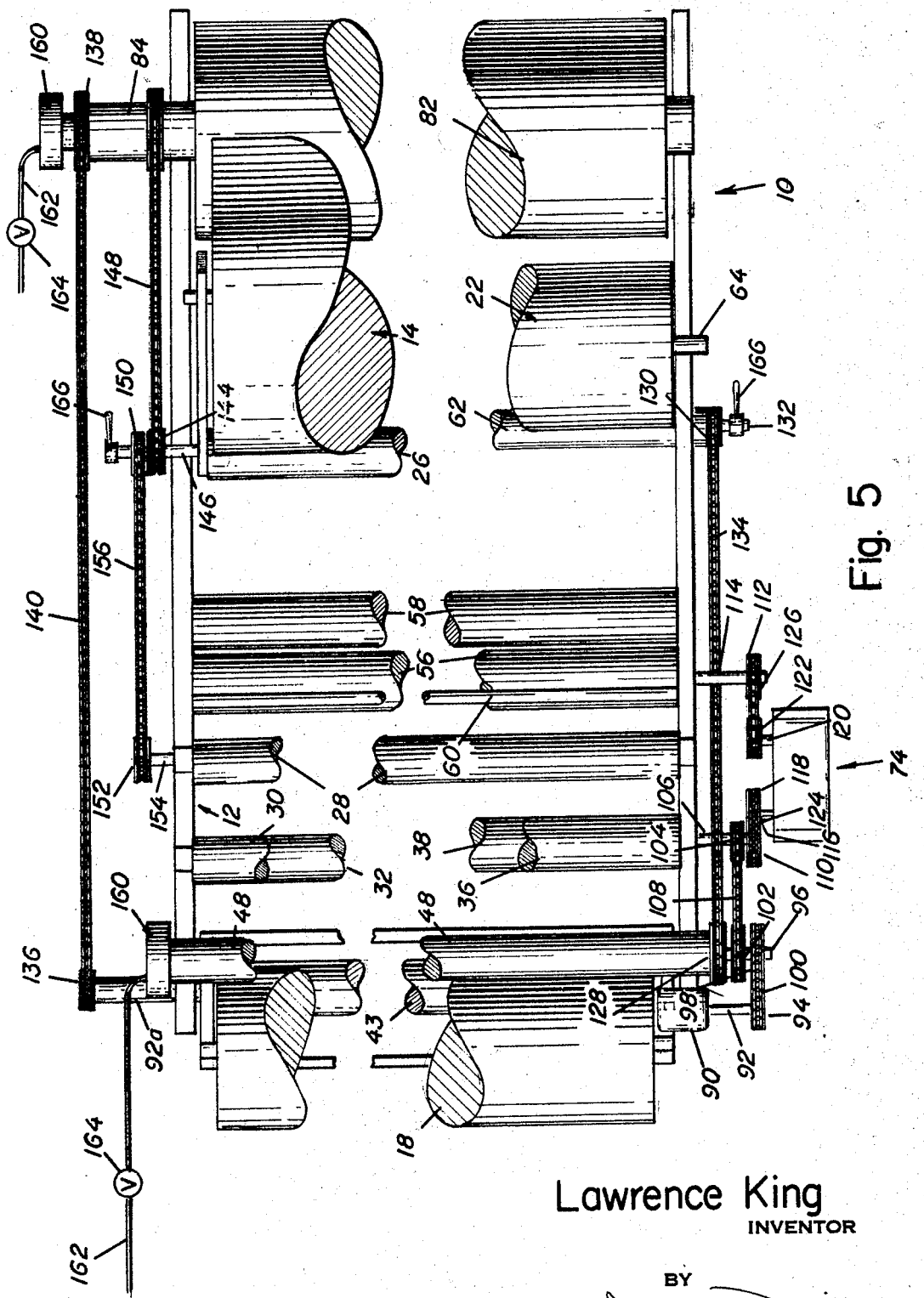

United States Patent Office  3,454,449
Patented July 8, 1969

3,454,449
APPARATUS FOR PRODUCING SANDWICH LAMINATIONS
Lawrence King, New York, N.Y., assignor to Rosfor Mills Corporation, New York, N.Y., a corporation of New York
Filed July 1, 1964, Ser. No. 379,508
Int. Cl. B32b 31/20
U.S. Cl. 156—497    6 Claims This invention relates to an apparatus for laminating sheet material. The method aspects hereof are particularly directed to producing a sandwich lamination of respective outer cover layers and an intermediate plastic foam layer. The apparatus aspects hereof, on the other hand, are concerned not only with the production of a sandwich lamination, but also with a machine which is capable of additionally being used to produce a single fabric to foam lamination and/or a fabric to fabric lamination.

As explained more fully below, the term single foam lamination applies to a laminate wherein an outer or cover layer (e.g. fabric) is bonded to a foam layer by heating the foam layer to render the same tacky and then pressing the cover layer onto the tacky foam surface. The term sandwich foam lamination applies to a laminate wherein respective fabric layers are bonded to opposite sides of a foam layer. The term direct fabric to fabric lamination applies to a laminate wherein respective fabric layers are directly bonded together.

All of the aforesaid types of laminations are desirable for particular purposes, and a laminating mill can be called upon to produce the various different types of laminations at different times during their normal operation.

Bearing in mind the foregoing, the invention is concerned with providing a machine which can be operated in accordance with the method hereof to produce a sandwich foam lamination with a single pass of the material through the machine. As an auxiliary aspect, but of equal significance, the invention is also concerned with providing such a machine which can effectively be used also to produce single foam laminations and fabric to fabric laminations. In other words, an important aspect hereof is to provide a laminating machine which can be easily utilized to perform various different types of laminations.

Notwithstanding the above, the problem of providing a technique and a machine for producing sandwich foam laminations during a single pass of the material through the machine was one of the more serious problems faced in the art. Thus, such problem and the operation of the machine provided hereby to make sandwich foam laminations are discussed initially and emphasized, subject to the understanding that the multi-purpose functions of the machine are still a significant aspect of the invention.

To more fully appreciate the foregoing, it is helpful to comprehend initially the development in the foam lamination art. Initially, laminations were formed by utilizing adhesive compositions to join two or more layers together, but it was soon discovered that laminations which were produced in this manner were generally unsatisfactory because such adhesives tended to deteriorate during laundering or dry cleaning, tended to mottle the appearance of the fabric cover layer in the lamination, and tended to cause the lamination to have a stiff and non-supple texture.

To overcome the difficulties associated with such liquid adhesive compositions, laminators turned to the use of a foamed plastic, such as a foamed polyurethane of the polyester type, and used this plastic as the adherent layer of the lamination. As indicated above, this was accomplished by a technique wherein one surface of the foamed plastic layer was heated to a temperature at which it became soft and tacky, and thereafter, a sheet or web of fabric was pressed into contact with the soft and tacky surface to form the ultimate fabric to foam lamination. It was found that the lamination produced in such a manner was soft and supple and had excellent properties of adhesion between the layers, and for this reason, such two layer laminations, having a sheet of fabric adhered to a sheet of foam, found widespread acceptance within the industry.

In order to produce such single layer laminations quickly, continuously and relatively inexpensively, laminating machines were developed. In such machines, the fabric layer was provided on a supply roll and the foam sheet was provided on a different supply roll. Each of the supply rolls was separately mounted on the machine and the layers or webs from such rolls were fed into the machine by feed rollers. As the foam web was fed inwardly, it passed across a suitable heating means, such as a gas burner, which partially melted one surface thereof, and immediately after such heating, the fabric web was adhered to this heated surface by means of a pair of laminating nip rolls which pressed the two webs into contact with one another. The lamination formed by such a technique was then fed out of the machine and was wound upon a take-up roll which stored the lamination in coiled form.

The initial laminations formed upon a machine of the type previously described, were "single" laminations wherein the laminate was formed of one layer of fabric and one layer of foam. However, it soon became apparent that such a laminating technique lent itself particularly well to forming a "sandwich" lamination having outer layers of fabric with an inner layer of foam disposed between them. Such "sandwich" laminates found utility in a variety of different applications, but were particularly well-suited for forming garments or articles of clothing. The desirability of a sandwich lamination for such apparel applications was enhanced by the fact that the outer fabric layer could be formed of wool or some other material which could form the exterior of the garment, the inner fabric layer could be formed of acetate, fur or some other material which could form the lining of the garment, and the foam layer served as the insulating layer.

When it became apparent that there were many extremely desirable and beneficial features associated with sandwich type laminations, and when such laminations received widespread acclaim and acceptance in the industry, it was necessary to devise a technique and a machine for rapidly and efficiently producing such laminations. The common technique which was adopted for forming such sandwich laminations was to utilize the same laminating machine which was used to form the single lamination and to merely run the fabric through the machine twice. In other words, one layer of fabric would be bonded to one side of a foam layer to form a single laminate. Then, the single laminate would be run through the machine again and the second fabric layer would be adhered to the foam side of the single laminate. The effect of such a technique was to form two single laminations, one between a fabric sheet and a foam sheet, and the second between the single lamination and the other fabric sheet. Such a technique was known as a "double pass" operation, since to form the sandwich lamination, it was required that the component layers thereof be passed through the machine twice, with one laminating operation taking place during each pass.

Such a double pass operation was unsatisfactory from its inception. While it did provide a satisfactory laminate, the very fact that a double operation of the laminating machine was required meant that, aside from material costs, a sandwich laminate cost twice as much to make as a single laminate. This was true because the machine and its operator were occupied for a double length of time to form the sandwich laminate, and the cost of such laminating is figured in the number of yards per hour which can be produced on such a machine.

Because of the general dissatisfaction with the double pass operation, laminators attempted to develop a new method and machine wherein a sandwich lamination could be produced in only a "single pass" through the machine. Heretofore, however, a suitable single pass technique could not be developed. One attempt to produce a sandwich laminate in a single pass involved heating and melting both sides of the foam simultaneously so that both fabric layers could be adhered at a single laminating station within the machine. This attempt, however, was unsuccessful since the simultaneous heating and bonding operations either caused wrinkles in the laminate, or damage to the fabric due to burning.

With the foregoing matter in mind, a primary object of the present invention is to overcome the difficulties and deficiencies encountered in the prior art and in prior attempts, and to provide in their stead, a method and apparatus capable of producing sandwich laminations during only a single pass through a laminating machine.

Another primary object of the present invention is to provide a method and means for laminating a first cover layer to one surface of a foam web and for thereafter laminating a second cover layer to the opposite surface of said foam web, with both of said laminating operations being effected while said web and layers feed continuously and without any rewinding being needed between successive laminating operations. A further primary object of the present invention in this regard is to provide a laminating machine having spaced apart laminating stations to thus permit a sandwich lamination to be produced during a single pass through the machine.

Additionally, it is a primary object of the invention to provide a laminating machine conforming with the preceding objects, which laminating machine is capable of easily being operated to produce single laminations, when desired, as opposed to sandwich laminations, and which machine is further capable of being utilized effectively to produce direct fabric to fabric laminations.

In this latter regard, and in addition to the types of laminations described comprehensively above, direct fabric to fabric laminations can be produced by a process involving the disintegration of a foam layer and the use of the resultant foam residue as a bonding agent. A lamination of this type and a process of making the same are described in my co-pending application Ser. No. 323,946, filed Nov. 15, 1963, and entitled "Laminated Products and Methods of Making Same" now U.S. Patent 3,362,862.

It is thus to be understood that aside from the specific general objects set forth above, a more comprehensive primary object of the present invention is to provide a machine which is capable of being operated easily to produce single foam laminations, to produce sandwich foam laminations, and to produce fabric to fabric laminations wherein the bonding agent is a disintegrated foam residue.

Further significant objects of the present invention include the provision of a laminating machine: (a) which is simple in design and which can operate continuously for prolonged periods without excessive maintenance or repair; (b) which can automatically and inexpensively produce high quality laminations; (c) which has a pair of spaced apart laminating stations which perform separate laminating steps during the sequence of forming a sandwich lamination; (d) which includes synchronism means for adjusting the tension between the laminating stations within the machine to thus assure that with a sandwich lamination, each cover layer is laminated to the foam layer under an equal tension; and (e) which can be easily controlled and operated by a normally skilled operator.

Other objects, advantages and salient features of the present invention will become apparent from the following detailed description, which, taken in conjunction with the annexed drawings, discloses a preferred embodiment thereof.

The foregoing objects are attained with respect to sandwich laminations by providing a method and a machine for performing the method wherein a pair of separate supply rolls are provided, with the fabric sheets forming the cover layers of the laminate being coiled upon such rolls. Also provided is a supply roll of coiled foam plastic which forms the central layer of the laminate. Within the machine, two spaced laminating stations are disposed in spaced apart relationship, with each of the stations including a pair of coacting nip rolls. The axes of one pair of nip rolls are preferably vertically coplanar while the axes of the other pair of nip rolls are preferably horizontally coplanar.

In operation to form a sandwich lamination, feed rollers deliver the foam layer and one of the fabric layers toward the first laminating station nip rolls. Just prior to its passage between such nip rolls, one surface of the foam layer passes in front of a heating means, preferably a flame head, which softens and partially melts the foam. When the fabric layer is pressed onto this softened surface during passage through the nip rolls, the foam and fabric become adhered to one another to form a single laminate. This single laminate is then fed toward the second laminating station nip rolls. Simultaneously, the second layer of fabric is directed by feed rollers to the second laminating station.

To assure that the final lamination is of proper character and quality, it is necessary to control the tension on the single laminate so that it is fed to the second laminating station with its component layers neither stretch nor sagging so that they are tensioned substantially the same amount as the second fabric layer. To accomplish such controlled tensioning, an adjustable synchronous drive means in interconnected between the first and second laminating station nip rolls to adjust the speed of the second nip rolls relative to the speed of the first nip rolls.

When the synchronous drive means has been properly adjusted so that the single laminate feeds at the proper speed and tension, the foam layer of the single laminate passes across a heating means which softens and heats it. Thereafter, the single laminate feeds through the second laminating station nip rolls wherein the second fabric layer is pressed into adherent contact with the foam. The result of such a method and thus the article produced by such a machine is a sandwich lamination wherein each of the fabric cover sheets is smooth, uniformly tensioned and firmly adhered to one another by means of the central foam layer. Such a sandwich laminate is flexible, supple and extremely attractive and useful.

The operations described immediately above are merely modified if the machine is used to produce a single foam lamination or a direct fabric to fabric lamination. In the former instance, the material is not processed or operated upon at the second laminating station, and of course, the second fabric layer is not used.

Where direct fabric to fabric laminations are to be made, then essentially the first laminating station is not utilized, and only the second laminating station is operated. At the second station, however, the foam layer is disintegrated in the manner explained in detail in my aforesaid prior application Serial No. 323,946. Moreover, in this instance, the foam layer used is thinner than the foam layer normally used to make sandwich laminations.

It is believed that the operation of the machine to make single laminations and to make direct fabric to fabric laminations will be readily understood after considering the overall operation used to make sandwich laminations, particularly in light of the now well known single lamination techniques and the clear explanation of the direct fabric to fabric laminations presented in the aforesaid application. Accordingly, the following detailed description refers primarily to the method of the invention for making sandwich laminations, and the operation of the machine consistent with this method.

In the drawings:

FIGURE 1 is a side elevational view of an apparatus in accordance with the principles of the present invention for carrying out the steps of the novel method set forth herein and for producing a product in the form of a sandwich lamination;

FIGURE 2 is a sectional view taken substantially along line 2—2 of FIGURE 1 and showing a section through the foam web;

FIGURE 3 is a sectional view taken substantially along line 3—3 of FIGURE 1 and showing a section through a single laminate;

FIGURE 4 is a sectional view taken substantially along line 4—4 of FIGURE 1 and showing a section through a sandwich laminate; and FIGURE 5 is a top plan view of the apparatus of FIGURE 1.

In general, the method of the present invention comprises steps that can be suitably carried out on a laminating machine or apparatus generally designated 10. The machine includes a main frame generally designated 12 having either operatively or directly connected thereto, a plurality of separate mounting means for rotatably mounting separate supply rolls of coiled sheets or webs.

One of the supply rolls is generally designated 14 and is composed of a coiled web 16 of foamed plastic, preferably a foamed polyurethane of the polyester type. Another of the supply rolls is generally designated 18 and is composed of a coiled web 20 of a fabric or other suitable material to be laminated to the foam web 16. The remaining supply roll is generally designated 22 and is composed of a coiled web 24 of fabric or other suitable material to be laminated to the foam web 16 on the side opposite to the fabric web 20.

The foam roll 14 is freely supported to roll upon a roller 26 which always contacts the outer periphery of the roll 14. A driving roller 28 is spaced away from the foam roll 14 to feed the web 16 toward a first laminating station within the machine. Thus, as the web feeds away from the roll 14, it feeds over a guide roller 30, around the feeding roller 28, over another guide roller 32, and across a conventional slat expander 34 which assures that the web remains taut and unwrinkled as it is fed to the first laminating station. The first laminating station is formed by a pair of spaced coacting nip rolls 36 and 38 which are rotatably mounted within the frame 12. The axes of the nip rolls 36 and 38 are parallel and vertically coplanar, in the manner shown in FIGURE 1. Mounted immediately adjacent the nip rolls 36 and 38 is a suitable heating means generally designated 40 which functions to render one surface of the foam web 16 thermoplastic. The heating means can be a radiant gas burner, a hot air source or any other suitable heating device which elevates the surface temperature of the foam web 16 to a point at which the surface partially melts and thus becomes soft and tacky. However, the heating means is preferably an elongated burner which maintains short flames directed toward the foam.

The fabric web 20 which is to be laminated to the foam web 16 at the first laminating station is supplied in a coil or supply roll 18 which is rotatably mounted in a movable carriage means generally designated 42 composed of a support roller 43, similar to the roller 26, mounted in a bed 44 having ground engaging wheels 46. The web 20 feeds off the roll 18, across a tensioning roll 48 and past a photocell edge scanning means generally designated 50 which senses the edge of the web 20 and moves the carriage 42 responsively to the edge sensing signal to thus keep the web properly aligned within and travelling straight through the machine 10. The actual operational details of the carriage means 42, the tensioning roll 48, the edge sensing means 50, and their manner of cooperation is described fully in my copending application Ser. No. 359,379, now Patent 3,284,015, the subject matter of which is hereby incorporated by reference hereinto. After the web 20 passes the edge sensing means 50, it passes around a conventional slat expander 52, similar to the slat expander 36, and thereafter feeds to the first laminating station.

As the foam web 16 enters the first laminating station, it wraps partially around the roll 36 and travels beneath it. As the fabric web 20 enters the first laminating station, it wraps partially around the roll 38 and travels above it. The two webs 16 and 20 are pressed into contact with one another at the nip between the two rolls 36 and 38 to thus bond the fabric web 20 to the heated thermoplastic surface of the web 16. This soft and tacky heated surface acts as a hot melt adhesive which adheres the two webs together to form a single laminate generally designated 54, as shown in FIGURE 3.

A second laminating station is also provided within the machine 10, spaced a finite distance away from the first laminating station. The second laminating station includes a pair of spaced coacting nip rolls 56 and 58 which are similar to the rolls 36 and 38. The axes of the nip rolls 56 and 58 are parallel and are horizontally coplanar, as shown in FIGURE 1. A heating means 60, preferably identical with the heating means 40, is disposed adjacent the nip rolls 56 and 58.

The single laminate is fed linearly from the first laminating station to the second one, and during its transit, the foam side thereof passes beneath the heating means 60 which renders the surface of the foam into a heated thermoplastic state, in the manner previously described.

The other fabric web 24 is likewise fed from its supply roll 22 to the second laminating station. The supply roll 22 abuts against a support roller 62, similar to the roller 26, and can also be journalled upon a laterally movable rod 64 which either forms a part of, or is connected to, a suitable cylinder and piston arrangement, not shown. As the web 24 feeds off of the roll 22, it passes beneath a guide roller 66 and across a pair of spaced idler rollers 68. Between the idlers 68, a photocell edge sensing means 70 is disposed to scan the edge of the web 24 to maintain it in proper alignment. The sensing means 70 is similar to the sensing means 50 and operates in a like manner. Thus, a signal from the sensing means 70 can be transmitted to the cylinder and piston means to move the rod 64 laterally and to hence bring the web back into its proper alignment. After the web 24 passes the sensing means 70, it feeds across a slat expander 72, similar to the slat expanders 34 and 52, and thereafter feeds to the second laminating station.

One of the important features of the present invention is its ability to laminate separate fabric webs to opposite sides of a foam web, with each of the fabric webs being smooth and under exactly the proper amount of tension. This is particularly difficult to accomplish where a single laminate, such as 54, is being bonded to a single fabric web, such as 24, since care must be taken to assure that the single laminate is delivered to the second laminating station not only on a smooth and unwrinkled condition, but also with the web 20 being tensioned equally to the web 24. If the fabric from which either or both of the webs are fabricated is a stretch material, such as spandex, the tensioning problems become more delicate and difficult. Therefore, to assure that the single laminate 54 is properly conditioned in terms of tension and feed speed, the second set of nip rolls is operated synchronously with, and as a function of, the first set of nip rolls. This is accomplished by virtue of an adjustable synchronous drive means generally designated 74, which will be described in more detail hereinafter. For present purposes, it is sufficient to state that the synchronizer 74 connects the driving nip roll 38 of the first laminating station with the driving nip roll 56 of the second laminating station through an adjustable means so that the speed of the second station nip rolls may be varied relatively to the speed of the first station nip rolls.

At the second laminating station, the single laminate 54 feeds around the roll 56 while the fabric web 24 feeds around the roll 58. The two are pressed into contact with one another at the nip between the rolls 56 and 58 to thus bond the fabric web 24 to the heated and thermoplastic foam side of the single laminate 54. The soft and tacky foam surface acts as a hot melt adhesive which adheres the fabric web 24 firmly thereto to thereby form a sandwich laminate generally designated 74, as shown in FIGURE 4.

After the sandwich laminate 74 is formed, it is fed away from the second laminating station by feeding around a guide roller 76, across a pair of spaced idler rollers 78 and 80, and is wrapped into a coil 82 which is formed upon a positively driven take-up roll 84, preferably rotatably mounted upon the machine frame 12. Due to the pressure applied at the laminating stations by the nip rolls, the foam layer is sometimes squeezed outwardly which tends to create a ragged appearance at the edges of the sandwich lamination 74. To remedy these ragged edges and to assure that the final sandwich lamination has square, aligned and uniform edges, rotary slitting knives 86 are provided beyond the second laminating station to cut the ragged edges from the sandwich laminate 74 before it is wound into the coil 82.

Referring now to FIGURE 1 and more particularly to FIGURE 5, there is illustrated a suitable form of driving mechanism for the various rolls which form a part of the machine 10. All of the driving is accomplished by means of a single main driving motor 90 which, while preferably an electric motor, can also be a gasoline engine or any other suitable prime mover. A stub shaft 92 projects from the motor 90 and has mounted thereon, a suitable sprocket 94. The motor 90 also drives the support roller 43 which is mounted beneath the fabric roll 18 to thus facilitate feeding of the web 20.

The tensioning roll 48 is provided with an outboard shaft end 96 having several sprockets affixed thereon, with one such sprocket being identified as 98 and being aligned with the motor sprocket 94. Trained between the sprockets 94 and 98 is a suitable driving belt or chain 100 which drives the tensioning roller 48 responsively to operation of the motor.

A sprocket 102 is also provided on the shaft 96 disposed in alignment with a similar sprocket 104 mounted on the end of a stub shaft 106 projecting from the nip roll 36. A driving belt or chain 108 is trained between the sprockets 102 and 104 so that the nip roll 36 is operated by rotation of the tensioning roll 48, which in turn is operated directly from the main motor 90.

Also mounted on the nip roll shaft 106 is another sprocket 110 which is disposed in alignment with a sprocket 112 mounted on the end of a stub shaft 114 which projects from the nip roll 56. As was previously explained, it is necessary that the nip rolls of the second laminating station operate synchronously with the nip rolls of the first laminating station, and to effect such synchronism, the adjustable or variable synchronous drive means 74 is provided. The drive means 74 has an input shaft 116 with a sprocket 118 thereon and an output shaft 120 with a sprocket 122 thereon. A driving belt or chain 124 is trained between the sprockets 110 and 118 while a similar belt or chain 126 is trained between the sprockets 112 and 122.

Suitable adjustment means is provided on the synchronizer 74 to permit the speed of the output shaft 120 to be varied relative to the speed of the input shaft 116. A commercially available synchronizer means embodying the principles needed in the means 74 is the P.I.V. variable speed drive unit manufactured by the Link-Belt Company. In operation, if the web 20 is fabricated of a heavy knit material, it becomes necessary to drive the output shaft faster than the input shaft so that the nip roll 56 operates faster than the nip roll 36 and thus takes up slack in the single laminate 54 occasioned by the heavy natural weight of the fabric layer 20. If, on the other hand, the web 20 is fabricated of a stretch fabric such as spandex, the output shaft can actually be run slower than the input shaft since the natural elasticity of the fabric prevents the single laminate 54 from becoming slack.

Another sprocket 128 is also provided on the tensioning roll shaft 96 and is disposed in alignment with a sprocket 130 on a stub shaft 132 projecting from the supporting roller 62 mounted beneath the fabric roll 22. A driving belt or chain 134 is trained between the sprockets 128 and 130 to thus operate the roller 62 and facilitate feeding of the web 24.

At the opposite end of the supporting roll 43, another stub shaft 92a projects laterally outward, as shown in FIGURE 5, to support a sprocket 136. It should be appreciated that, if desired, the stub shaft 92a can be eliminated and the sprocket 136 can be attached directly to the stub shaft 92, but for purposes of simpler illustration, the stub shaft 92a has been shown. The central shaft 84 upon which the take-up roll 82 is mounted, has at one end thereof, a sprocket 138 aligned with the sprocket 136. A driving chain or belt 140 is trained between the sprockets 136 and 139 whereby rotation of the roller 43 is transmitted directly to the take-up roll shaft 84.

The shaft 84 is also provided with an additional sprocket 142 which is aligned with a similar sprocket 144 on a projecting shaft 146 which extends from the foam support roller 26. A driving chain or belt 148 is trained between the sprockets 142 and 144 to drive the support roller 26 which is mounted beneath the foam roll 14 and to thus facilitate feeding of the foam web 16. Another sprocket 150 is also mounted on the shaft 146 and is aligned with a similar sprocket 152 on a shaft 154 which projects from the roll 28. A driving chain or belt 156 is trained between the sprockets 150 and 152 to thus drive the roller 28 responsively to rotation of the foam support roller 26.

It can thus be seen and appreciated that the entire machine 10 and its sequence of operations are controlled by the single main driving motor 90. On the other hand, it will be recognized that material is feeding to or from four separate supply rolls 14, 18, 22 and 82, and the character of material is different for at least three of the four rolls, and possibly for all of them if the fabric in the roll 18 differs from that of the roll 22. Each roll of material has a different thickness, weight, elasticity and other related properties and therefore, it is necessary that the feed speed of each of the rolls be properly controlled.

To accomplish such a control of the feed speed of each of the rolls, a plurality of variable speed controllers are employed in the machine 10. One form of variable speed controller which is useful in the present machine is a friction brake means generally designated 160 and shown mounted on the outboard end of the tensioning roller 48 for the web 20 and the shaft 84 for the take-up roll on which the sandwich laminate 74 is coiled. The detailed construction and operation of the friction brake means 160 is described fully in my previously referred to application Ser. No. 359,379, now Patent 3,284,015 filed Apr. 13, 1964, which is incorporated by reference hereinto. However, for purposes of ready description, a simple discussion of the friction brake means will be presented hereinafter.

Within each brake means casing, two separate friction discs are mounted. One disc is mounted on the shaft to which the brake means is attached, and this disc rotates along with the shaft. The other disc is non-rotatably mounted, but is slidable toward and away from the rotary disc. The sliding of the other disc can be controlled by means of a pneumatic or hydraulic line 162 having an adjustable valve 164 therein. When the valve is closed, there is little or no friction between the discs and the shaft rotates substantially at its normal driven speed. However, as the valve is opened, the slidable disc is moved closer to the rotating disc, and a frictional force is set up between the discs, thus slowing the speed of shaft rotation. The further the valve 164 is opened, the slower the speed of shaft rotation becomes, and thus by setting the valve to a preselected position, the shaft speed will be varied to a preselected rate. Effectively, the operation of the friction brakes is a tensioning control rather than a speed control, although it has been described as a speed control for accuracy. The speed relationship desired is maintained for tensioning purposes, however, as should be apparent.

As an alternative to the friction brake means 160, simple manually operated levers 166 may be provided, as shown attached to the stub shafts projecting from the supporting rollers 26 and 62. Such rollers may be eccentrically journalled within the frame so that manual movement of the levers 166 will cam the rollers toward or away from the rolls 14 and 22 which they are driving and hence will selectively vary the speed of such rolls and the webs fed therefrom.

It should be understood that many suitable changes can be made in the driving means depending upon cost and space requirements. Thus, sprockets and chains can be used in the locations shown or in any other suitable location or manner of connection. Alternatively, belts and pulleys may be used in place of chains and sprockets. Finally, it should be understood that to lend an additional measure of versatility to the machine, the entire second laminating operation can be omitted on such occasions where it is desired to form only a single laminate.

After reading the foregoing detailed description, it should be apparent that the objects set forth at the outset of the specification have been successfully achieved. Accordingly, what is claimed is:

1. A laminating machine capable of producing a sandwich lamination of two cover materials and foam therebetween, said lamination occurring within a single pass through said machine, said machine comprising:
   a first pair of coacting nip rolls defining a first laminating station;
   a second pair of coacting nip rolls defining a second laminating station spaced away from said first laminating station;
   first and second heating means disposed respectively adjacent said first and second laminating stations;
   means for continuously feeding a first cover web and a foam web from separate sources toward said first laminating station;
   said first heating means softening and partially melting a surface of said foam web as it feeds toward said first laminating station;
   said first pair of nip rolls pressing said first cover web into adherent contact with the softened surface of said foam web to form a single laminate;
   further means for continuously feeding said single laminate and a second cover web toward said second laminating station;
   said second heating means softening and partially melting the foam side of said single laminate;
   said second pair of nip rolls pressing said second cover web into adherent contact with the softened foam side of said single laminate to form a sandwich lamination; and
   controlled tensioning means between the first and second nip roll pairs, said controlled tensioning means causing said single lamination to pass from said first nip roll pair substantially without sag or stretch, said controlled tensioning means tensioning said single laminate substantially the same amount as said second cover web, said controlled tensioning means including drive means operatively connected to both pairs of nip rolls so as to control the speed of one of said nip roll pairs relative to the speed of said other nip roll pair, said drive means being adjustable.

2. A machine as defined in claim 1, wherein the axes of the nip rolls in said first pair are parallel and vertically coplanar while the axes of the nip rolls in said second pair are parallel and horizontally coplanar.

3. A laminating apparatus compirsing:
   a main machine frame;
   a plurality of supply roll mounting means connected to said frame;
   one of said mounting means being adapted to rotatably support a coiled web of foam plastic;
   another of said mounting means being adapted to rotatably support a coiled web of a first fabric;
   still another of said mounting means being adapted to rotatably support a coiled web of a second fabric;
   a first set of parallelly arranged coacting nip rolls mounted within said frame;
   a first heating means mounted on said frame closely adjacent said first set of nip rolls;
   feeding means for continuously directing said foam web and said first fabric web to said first set of nip rolls;
   said first heating means directing heat against one surface of said foam web to render it thermoplastic;
   said first fabric web and the thermoplastic surface of said foam web being pressed into adhering contact with one another between said first set of nip rolls to form a single laminate;
   a second set of parallelly arranged coatcing nip rolls mounted within said frame and spaced away from said first set of nip rolls;
   said single laminate continuously feeding from said first set to said second set of nip rolls;
   a second heating means mounted on said frame closely adjacent said second set of nip rolls and directing heat against the foam side of said single laminate to render at least a portion thereof thermoplastic;
   additional feeding means for continuously directing said second fabric web to said second set of nip rolls whereat it is pressed into adhering contact with the heated foam surface of said single laminate to thus form a standwich lamination having a central layer of foam and cover layers of fabric; and
   controlled tensioning means between the first and second sets of nip rolls, said controlled tensioning means causing said single laminate to pass from said first nip roll set substantially without sag or stretch, said controlled tensioning means tensioning said single laminate substantially the same amount as said second fabric web, said controlled tensioning means including drive means operatively connected to both nip roll sets so as to control the speed of one of said nip roll sets relative to the speed of said other nip roll set, said drive means being adjustable.

4. A laminating apparatus as defined in claim 3, further including:
   a take-up roller mounted on said frame and operative to wind said sandwich lamination into a coiled condition;
   positively driven drive means for said take-up roller, said drive means being adjustable.

5. A laminating apparatus as defined in claim 3, wherein a plane passing through the axes of said first set of nip rolls is substantially perpendicular to a plane passing through the axes of said second set of nip rolls.

6. A laminating apparatus as defined in claim 3, further including an edge sensing means, said edge sensing means scanning the edges of said webs to insure that such webs are properly aligned within said apparatus, at least one of said fabric web mounting means being movable responsively to said edge sensing means to keep said webs in alignment.

References Cited

UNITED STATES PATENTS

| | | | |
|---|---|---|---|
| Re. 25,493 | 12/1963 | Dickey | 156—82 |
| 2,627,296 | 3/1953 | Secrest | 156—495 X |
| 2,957,793 | 10/1960 | Dickey | 156—82 |
| 3,020,194 | 2/1962 | Jeroth | 156—311 X |
| 3,131,105 | 4/1964 | Codos | 156—82 |
| 3,264,166 | 8/1966 | Lowery | 156—79 X |
| 3,239,399 | 3/1966 | King | 156—82 |
| 3,249,482 | 5/1966 | Gilfillan | 156—324 |
| 3,368,932 | 2/1968 | Weill et al. | 156—497 |

FOREIGN PATENTS 813,311  5/1959  Great Britain.

EARL M. BERGERT, *Primary Examiner.*

C. B. COSBY, *Assistant Examiner.*

U.S. Cl. X.R.

156—82; 161—190